(No Model.)

A. A. GRAHAM.
HEATER FOR TEA OR COFFEE.

No. 582,858. Patented May 18, 1897.

WITNESSES:

INVENTOR
Andrew A. Graham

UNITED STATES PATENT OFFICE.

ANDREW A. GRAHAM, OF SPOKANE, WASHINGTON.

HEATER FOR TEA OR COFFEE.

SPECIFICATION forming part of Letters Patent No. 582,858, dated May 18, 1897.

Application filed October 29, 1896. Serial No. 610,517. (No model.)

*To all whom it may concern:*

Be it known that I, ANDREW A. GRAHAM, residing at Spokane, in the county of Spokane and State of Washington, have invented a new and useful Heater for Tea or Coffee, of which the following is a specification.

The object of this invention is to provide a new and improved heater for coffee, tea, &c., and to keep hot a certain amount of liquor without the loss of strength and aroma by evaporation, thus making this invention a useful improvement for restaurants, hotels, &c.

Figure 1:
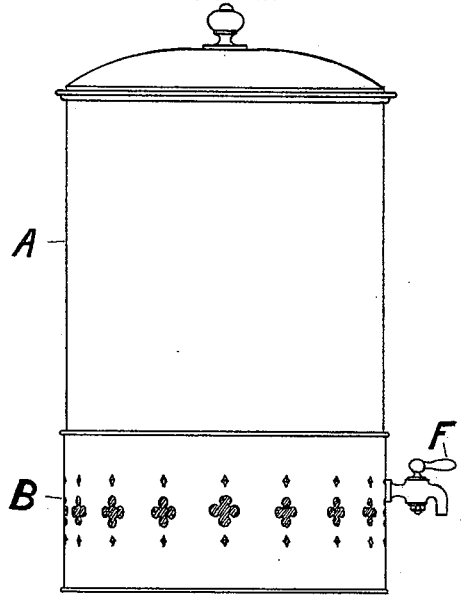
Figure 2:
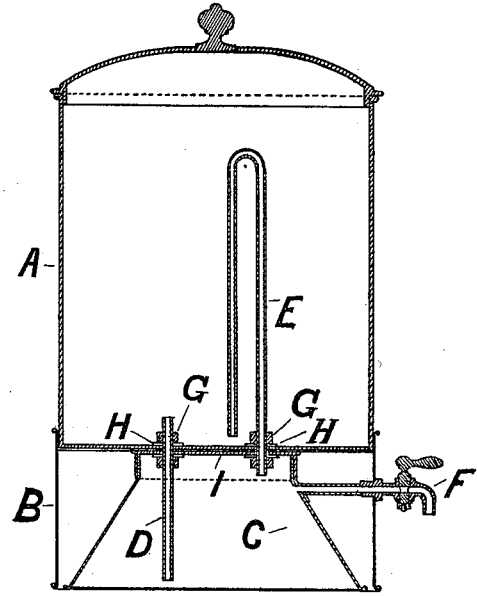
Figure 3:
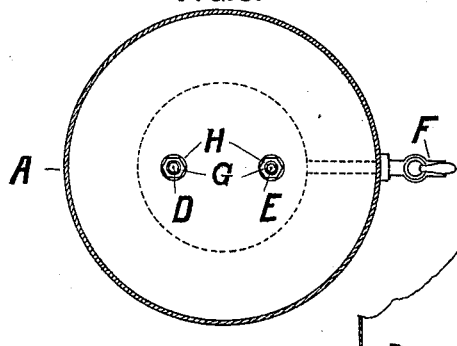
Figure 4:
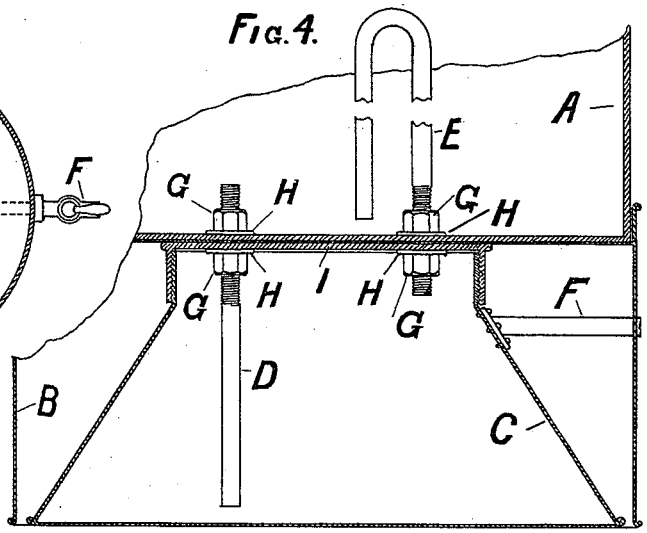

In the drawings, Figure 1 is a side view of the apparatus. Fig. 2 is a transverse vertical section of same. Fig. 3 is a horizontal section or plan of same, and Fig. 4 is a larger scale vertical section of lower part of apparatus.

A represents a flat-bottomed vessel with a movable cover on top suitable for holding liquids.

B represents holder or stand for vessel A.

C represents a conical vessel made of sheet metal with a movable cover I, provided with threaded flange for securely fastening it to the top of vessel C. Vessel C is placed within stand B directly beneath vessel A.

D represents a tube made to reach from bottom of vessel A through same and top I to within one-half inch of bottom of vessel C, and is on the upper end threaded to receive nuts.

E also represents a tube which extends from the top of vessel C through same and bottom of vessel A to a suitable height in vessel A, where it is curved and returned to within one-half inch of the bottom of vessel A. It is provided with threads on lower end to receive nuts.

F represents a faucet which is fastened to upper edge of vessel C and detachable from same. It extends to outside of stand B.

G represents nuts which are placed on the ends of tubes D and E and serve to firmly hold the tubes in place and connect the two vessels A and C.

H represents leather washers which are to be placed between the nuts and bottom of vessel A on the upper side and between the nuts and cover I of vessel C on the lower side and serve to prevent leakage.

Put together in above-described manner the apparatus is ready for operation.

The apparatus operates as follows: Pour the liquor into vessel A and let it run through tube D into vessel C, apply heat to the bottom of vessel C, and when the liquor in vessel C begins to evaporate the vapor will exhaust through tube E and condense in the cooler liquor in vessel A, thus circulating without deterioration. When the faucet F is opened, the hottest liquor in the vessel C is forced out as the cooler liquor enters the vessel C at the bottom through tube D and forces the hotter fluid toward the top of the vessel C.

The advantages of my combination are as follows: I have access to any part of the apparatus and can conveniently take it apart for cleaning, &c. I can attach the lower vessel C to any flat-bottomed jar, can, or urn. I draw the hottest liquor through the faucet F by having same placed at the top of vessel C. I can retain the aroma and the strength of the liquor by allowing the vapor to pass from vessel C through curved tube E and condense in the fluid near bottom of vessel A. Only a small amount of liquor is boiling hot at once, and consequently only a small amount of heat is required.

Having thus fully described my invention, what I claim as new, and desire to secure by Letters Patent, is—

In a liquid-heater, the combination of the base B, of the vessel A provided with a detachable heating-chamber C, a pipe D leading from the bottom of vessel A to near the bottom of chamber C, a curved pipe E leading from the top of chamber C to near the bottom of vessel A, and a faucet connected with chamber C near its top, substantially as described.

ANDREW A. GRAHAM.

Witnesses:
D. C. CARLTON,
H. G. BROWN.